United States Patent
Heisenberg et al.

(10) Patent No.: US 6,935,193 B2
(45) Date of Patent: Aug. 30, 2005

(54) DEVICE FOR MEASURING THE ANGLE AND/OR THE ANGULAR VELOCITY OF A ROTATABLE BODY AND/OR THE TORQUE ACTING UPON SAID BODY

(75) Inventors: David Heisenberg, Gerlingen (DE); Thomas Klotzbuecher, Rudersberg (DE); Gunter Haas, Leonberg (DE); Lutz Dorfmueller, Gerlingen (DE); Henrik Siegle, Leonberg (DE); Axel Wenzler, Stuttgart (DE); Klaus Marx, Stuttgart (DE); Franz Jost, Stuttgart (DE); Ralf Noltemeyer, Wernau (DE); Martin Freitag, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 10/148,666

(22) PCT Filed: Dec. 5, 2000

(86) PCT No.: PCT/DE00/04335

§ 371 (c)(1), (2), (4) Date: Oct. 3, 2002

(87) PCT Pub. No.: WO01/42753

PCT Pub. Date: Jun. 14, 2001

(65) Prior Publication Data

US 2003/0145663 A1 Aug. 7, 2003

(30) Foreign Application Priority Data

Dec. 6, 1999 (DE) .......................................... 199 58 598
Aug. 22, 2000 (DE) .......................................... 100 41 095

(51) Int. Cl.$^7$ ............................................... G01L 3/02
(52) U.S. Cl. ............................................... 73/862.324
(58) Field of Search ...................... 73/862.324, 862.624

(56) References Cited

U.S. PATENT DOCUMENTS

| | | | |
|---|---|---|---|
| 2,978,902 A | | 4/1961 | Felder |
| 3,871,215 A | | 3/1975 | Pratt |
| 4,590,806 A | * | 5/1986 | Lutton et al. .......... 73/862.327 |
| 4,624,336 A | * | 11/1986 | Eddy .......................... 180/422 |
| 5,438,882 A | * | 8/1995 | Karim-Panahi et al. .......... 73/862.324 |
| 5,734,108 A | * | 3/1998 | Walker et al. ................. 73/650 |
| 6,296,977 B1 | * | 10/2001 | Kaise et al. .................. 430/30 |

FOREIGN PATENT DOCUMENTS

| | | |
|---|---|---|
| DE | 195 06 938 A1 | 8/1996 |
| EP | 0 313 999 A | 5/1989 |
| EP | 0 638 789 A | 2/1995 |

* cited by examiner

Primary Examiner—Edward Lefkowitz
Assistant Examiner—Lilybett Martir
(74) Attorney, Agent, or Firm—Michael J. Striker

(57) ABSTRACT

A device for measuring an angle and/or the torque acting on a rotatable body is proposed according to the invention, whereby the rotational angle is detected by means of magnetic or optical sensors. In particular, in a preferred exemplary embodiment, two devices (7, 8) are proposed, each of which comprises two optically readable code tracks. The two code tracks (1a, 1b or 2a, 2b) on one device (7 or 8) are similar in design and are offset in relation to each other, so that associated sensors (4) output a digital signal. The rotational angle is calculated based on the lag between the two digital signals. In a further embodiment it is provided that a torsion element (5) having a known torsional stiffness is situated between the two devices (7, 8). Torque transferred by the rotatable body (3) can also be calculated therefore from the angular difference of the two devices 7, 8. The device is used preferably in the steering axle of a motor vehicle.

11 Claims, 10 Drawing Sheets

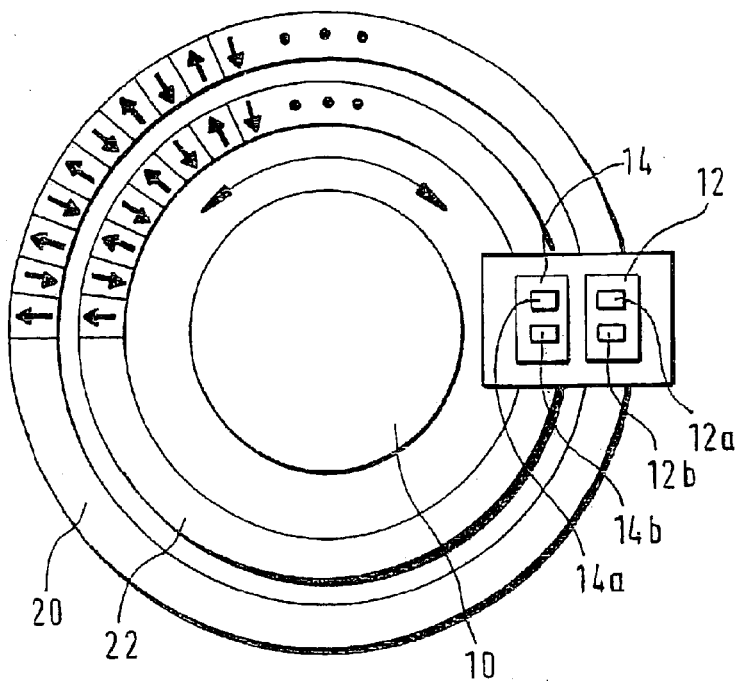
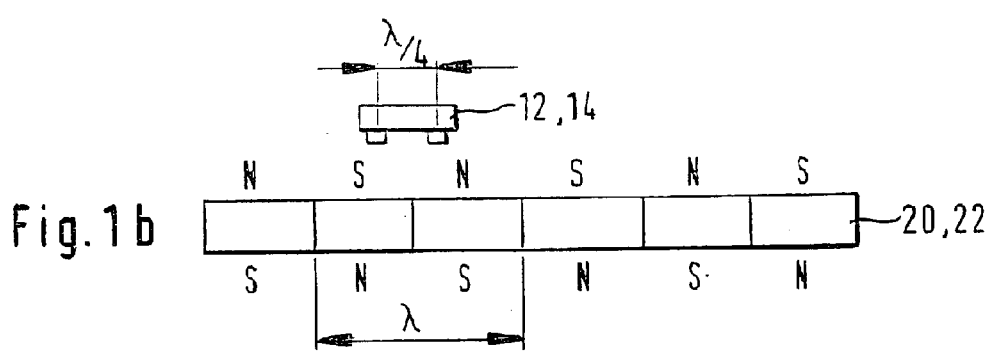
Fig. 1a
Fig. 1b
Fig. 1c    Fig. 1d

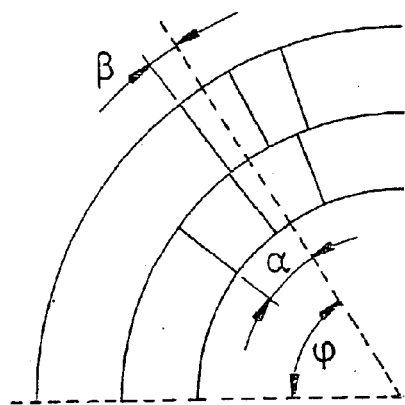
Fig. 1e
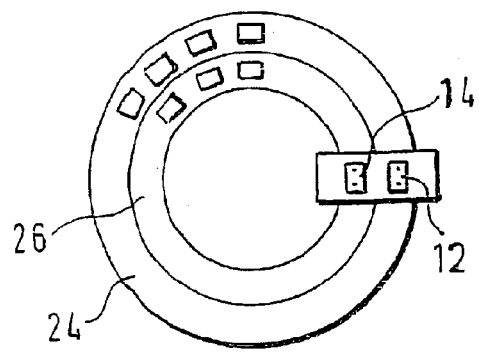
Fig. 2a
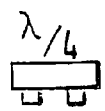
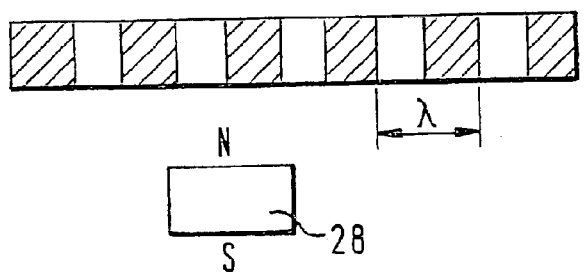
Fig. 2b
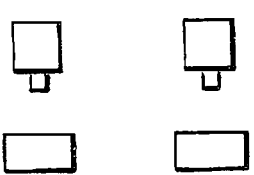 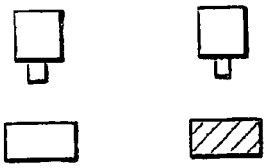
Fig. 2c
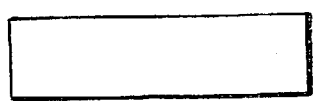 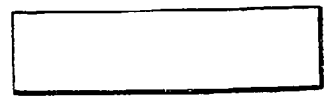
Fig. 2d

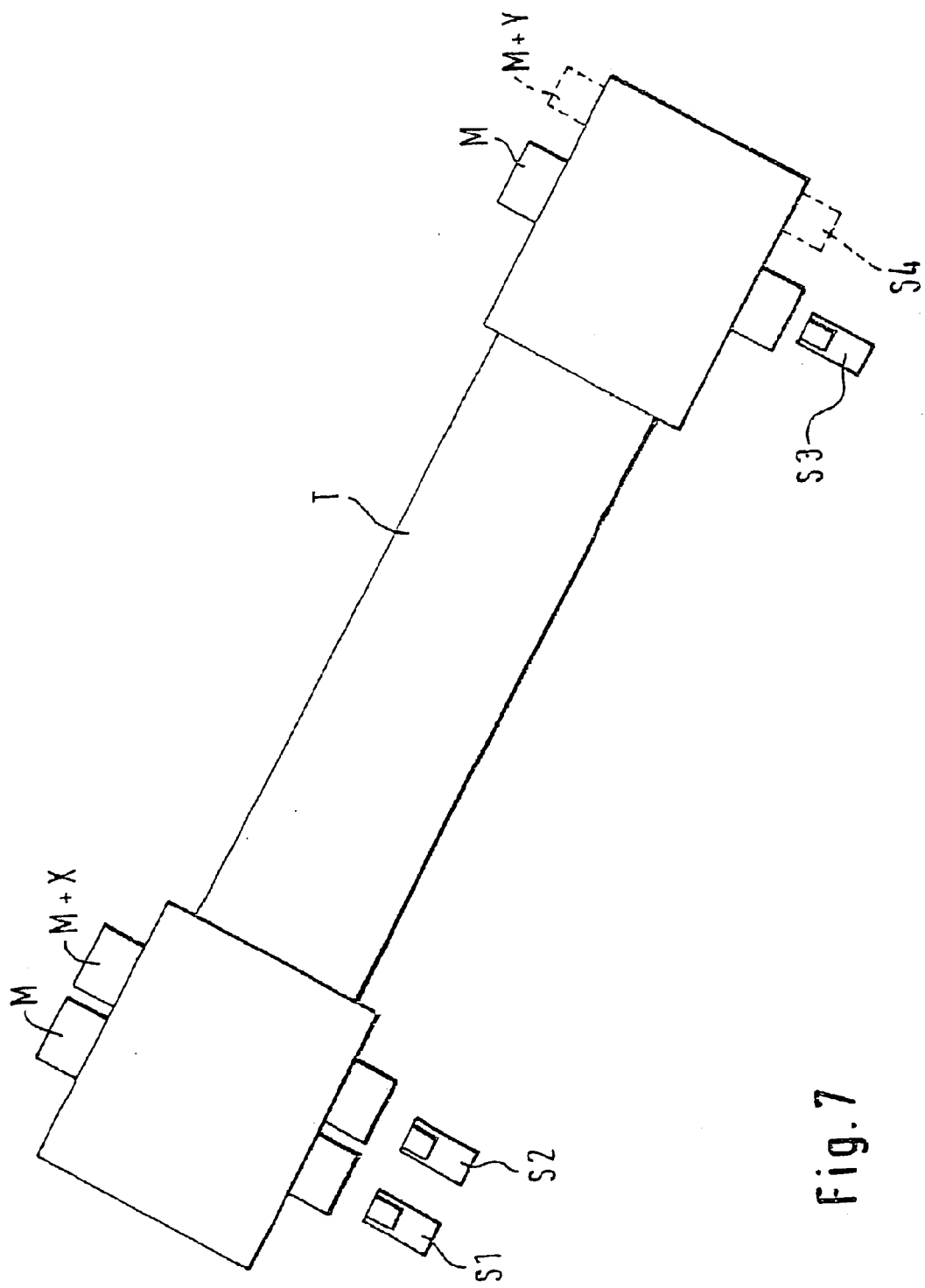

Variations
↓
Variationen : n+1 } expanded vernier
　　　　　　　　n 　 } erweiterter Nonius n+2 } expanded vernier
n+1 } erweiterter Nonius
n

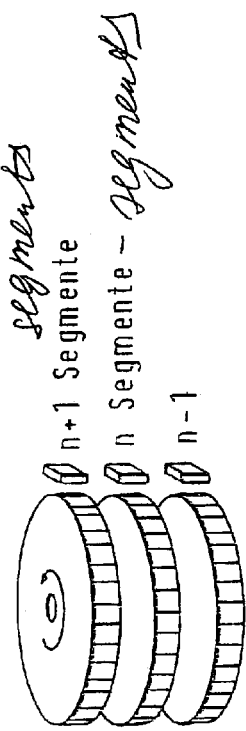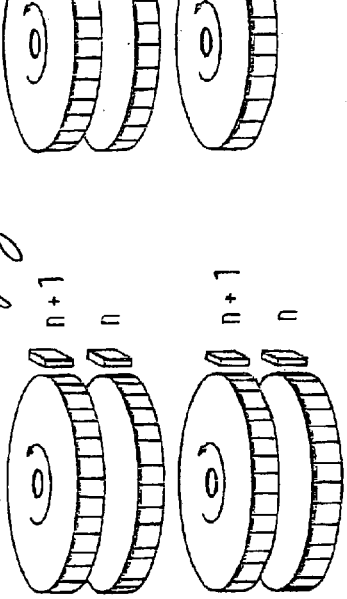
Fig. 9

DEVICE FOR MEASURING THE ANGLE AND/OR THE ANGULAR VELOCITY OF A ROTATABLE BODY AND/OR THE TORQUE ACTING UPON SAID BODY

BACKGROUND OF THE INVENTION

The invention concerns in general a device for measuring the angle and/or angular velocity of a rotatable body, and, in particular, a device for measuring the angle and/or angular velocity of a rotatable body and/or of the torque acting on it.

A very exact determination of a rotational angle is necessary for many systems, e.g., in the automotive industry. A specific application of such a device is a steering-wheel angle sensor, whereby enormous safety requirements exist.

A device is made known in DE-A-195 06 938 belonging to the applicant, which said device is used to measure the angle and/or the angular velocity of the rotatable body, in particular a body that can be rotated by more than 360°, according to the preamble of claim 1. In the case of the known device, the first and second devices are each formed out of a toothed wheel with associated angle sensor, whereby the two toothed wheels—when the numbers of teeth are different—are in mesh with one toothed wheel that is mounted on the steering-wheel shaft. Using a modified vernier method, the angle of the steering axle can therefore be determined from the current angular and/or phase difference between the two toothed wheels. This device therefore offers the advantage that multiple rotations can be detected, but it is disadvantageous in that the detection takes place by means of the interconnection of toothed wheels and therefore not in a contactless manner. Moreover, the installation space required for such a device is relatively large, making it difficult to integrate it, particularly on the steering axle, where the multi-function switches are also accommodated. Finally, a laborious evaluation using an arc tangent method is required to measure the individual rotational angles.

Furthermore, diverse angle sensors are known that are based on contactless detection. They are generally not suited to measuring angles with great accuracy. These devices and methods also require expensive evaluation circuits and algorithms or, alternatively, they have insufficient accuracy or an insufficient measuring range if the device is suited only for use with small angles, for example.

There is a need, therefore, for an improved device for measuring the angle and/or the angular velocity of a rotatable body and of the torque acting on it. It is an object of the present invention to further develop a generic device—as was made known in DE-A-195 06 939, for example—having at least first and second devices that output different signals to an evaluation circuit in response to a rotation of the body in such a fashion that it takes up very little space and makes a simple evaluation and determination of the angle possible, whereby the detection is to take place in contactless fashion overall.

SUMMARY OF THE INVENTION

It is an object of the present invention to provide a device for measuring the angle and/or angular velocity of a rotatable body and/or of the torque acting on it, which is a further improvement of the existing devices.

In particular, the invention proposes that, in the case of the generic device, a field-producing and/or field-changing arrangement or an arrangement that responds to the field is associated with the rotatable body and the stationary part of the device as a component of every device. In this fashion, every one of the devices that responds differently to a rotation of the body provides an output signal that can be detected in contactless fashion. Once the angle is measured directly at the rotatable body, the error influence—resulting from the tolerances of toothed wheels used so far—can be avoided. Low-noise operation that is free from wear is advantageous.

Advantageously, the arrangement responding to the field can contain a field-producing and/or field-changing arrangement, by way of which the mutually-influencing or mutually-influenced fields can be evaluated in order to obtain the rotational angle to be measured.

In order to obtain an insensitivity to fluctuations in the space between the components of the devices, it is preferred that at least one field flux concentrating element is provided, in particular to form closed field lines. In this fashion, tolerances and time-induced changes in fields can also be handled more easily, which makes the width of the pole-face arc non-critical when magnets are used.

Advantageously, at least one of the field-producing and/or field-changing arrangements provides a periodically changing field, in particular an electrical and/or magnetic field. When a periodically changing field is involved, the detection accuracy can be increased by means of an appropriate design of the sensors, whereby minimal angular increments in particular can be determined with greater accuracy by means of a periodically changing magnetic field. In general, the accuracy increases with the number of pole pairs.

In the case of a preferred exemplary embodiment, at least one of the field-producing and/or field-changing arrangements is designed extending around the periphery in relation to the rotatable body, in particular located on said rotatable body or integrated in it. This preferred exemplary embodiment makes a device possible that requires only a minimal amount of space, so that it can be used easily as a steering angular sensor.

At least one of the field-producing and/or field-changing arrangements can form a radial field, e.g., a magnetic field, electrical field, or an electromagnetic field. In this case, the sensors could be provided radially in relation to the rotating body.

As an alternative, it is also possible that at least one of the field-producing and/or field-changing arrangements forms an axial field, whereby a corresponding positioning of the detection sensors is to be carried out.

Advantageously, at least two field-producing and/or field-changing arrangements are provided that form different fields, in particular defining a different number of field poles, whereby, in particular, this said number of field poles can differ by one. By providing two field-producing and/or field-changing arrangements, a complete decoupling can take place, in particular when two separate detection arrangements are formed at appropriate locations.

In a preferred exemplary embodiment, at least one of the field-producing and/or field-changing arrangements is designed as a multi-pole wheel or a multi-pole ring. A multi-pole wheel or ring is an arrangement of poles that comprises, in alternating fashion, inverse poles, or they also contain, in alternating fashion, field-producing and non-field-producing or field-influencing and non-field-influencing portions.

The field-changing arrangement can advantageously have the shape of a punched, slotted, or perforated disk, or a punched, slotted, or perforated ring, independently of whether radial or axial fields are used.

So that each of the devices provides an output signal that is as easy to evaluate as possible and is as linear as possible, at least one of the arrangements responding to the field can contain two field sensors that deliver sinusoidal or asinusoidal output signals, separated, in particular, by a quarter period of the periodic field formed by the corresponding field-producing and/or field-changing arrangement. As described above, the field can be an electrical field, a magnetic field, or any electromagnetic field.

Advantageously, the sensors in this case are connected in a bridge circuit, in particular a Wheatstone bridge circuit, and they output their signals to said circuits. When the bridge circuit is used, subtraction can be performed. When elements having a linear characteristic as well are used, the respective, outputted angular value can be determined directly without using a complex arc tangent procedure.

In the case of a particularly preferred exemplary embodiment, each sensor of a device is connected in a partial-bridge circuit, in particular a half-bridge of the bridge circuit.

Finally, it is preferred that the device according to the invention is used as a steering-wheel angular sensor, and at least two field-producing and/or field-changing arrangements are assigned to the steering shaft as field-pole code tracks, in particular magnetic code tracks.

An alternative exemplary embodiment—that is essential to the invention in terms of measuring an angle and/or torque—is provided that detects a rotational body opposite to the fixed sensors using first and second optical devices. It is considered to be particularly advantageous that the optical devices are attached to the rotatable body—the steering axle of a motor vehicle in this case. The two devices substantially comprise two optically readable code tracks, whereby each code track is associated with an optical sensor. The advantage of optical sampling is the fact that the beams of light are easier to detect and they cannot be influenced by electromagnetic interference fields. Additionally, the optically-readable signal can be converted to an electrical signal very easily using a photo-sensor. It is also advantageous that a digital output signal is obtained by means of the optical sampling, based on which digital output signal the angle or angular changes can be determined with a high degree of accuracy and a high degree of insensitivity to contamination.

Advantageous further developments and improvements of the device described in the main claim are made possible by means of the measures listed in the dependent claims. In particular, the code signal is detected in digital and analog form by means of a plurality of optically-readable markings, so that the rotational angle can be determined using simple phase comparison between associated code tracks.

It is also favorable that the fields of the markings can be differentiated in terms of their light intensity, color, and/or size. In the case of adjacent light-dark fields in particular, unambiguous light-dark transitions occur that can be detected based on the steep voltage jump of the electrical signal. An unambiguous delineation therefore results, which is largely immune to interference.

The contrast between the light-dark fields and at the light-dark transitions can be improved even further by illuminating the markings using a light source. In the case of tracks on one device that have an identical design, this results in two different signal sequences; this makes it particularly easy to determine the angle, e.g., using a classical or modified vernier method. For this purpose, the number of markings of adjacent tracks on one device are advantageously selected to be different, in order to obtain a phase displacement that is changeable around the circumference of the axis of rotation.

When an appropriate number of markings on a track is selected and when the markings are designed appropriately, the vernier method and, in particular, the modified vernier method, can be used to measure the angle. The measuring accuracy is advantageously increased by correcting the results of the measurements from the code tracks anew using the modified vernier method.

In cases where torque is to be determined as well, a torsion element having a known torsional stiffness is used between the two devices. If the rotational angle of the first as well as the second device is then measured, then the torque can be advantageously determined from the difference of the two angles and the known torsional stiffness. In this fashion, two variables can be measured simultaneously using the device according to the invention.

The markings of the two devices are preferably selected so that the classical or modified vernier method can be applied anew to the respective measured results. This increases the measuring accuracy and/or the measuring range of the device without requiring additional devices.

In order to protect the optical devices from potential risk of contamination in the motor vehicle, an enclosing metal-cladding for the device appears to be particularly advantageous.

An advantageous application of the device is seen in the case of a steering axle of a motor vehicle, in order to measure the rotational angle and/or the torque. These variables can be used for further vehicle functions that are required, for example, to determine the dynamic vehicle stability, and to support the steering effort and/or navigation.

In summary it can be stated that, with the means of achieving the object, according to the invention, a simple detection of angles and/or angular velocities of a rotatable body is given that also includes measurement of torque, whereby the evaluation circuit can be designed simple in nature, and the space required to implement the device is very small.

Further advantages and features of the present invention result from the following—purely exemplary—description of a few preferred exemplary embodiments, whereby the description makes reference to the attached drawings. dr

BRIEF DESCRIPTION OF THE DRAWINGS

FIG. 1 shows a steering-wheel angular sensor according to a first preferred exemplary embodiment of the invention in a systematic view (FIG. 1A), in a tangential side view (FIG. 1B), in radial side views at different angular positions (FIGS. 1C and 1D), and showing angular dimensions (FIG. 1E).

FIG. 2 shows a variant of the exemplary embodiment shown in FIG. 1 in corresponding representation, in a systematic view (FIG. 2A), in a tangential side view (FIG. 2B), and in radial side view at different angular positions (FIG. 2C and 2d), whereby field-changing devices are implemented in this case, as opposed to the field-producing devices used in FIG. 1.

FIG. 6 is a schematic view of the position detection in the case of the exemplary embodiment shown in FIG. 5 using field flux concentrating elements.

FIG. 7 shows an exemplary embodiment of a combination steering-angle/steering-torque sensor (schematically).

FIG. 9 shows various designs of sensors according to FIG. 7 or 8, whereby a plurality of sensors per magnetic track can also be present for the purpose of averaging.

DESCRIPTION OF THE PREFERRED EMBODIMENTS

Figure 3:
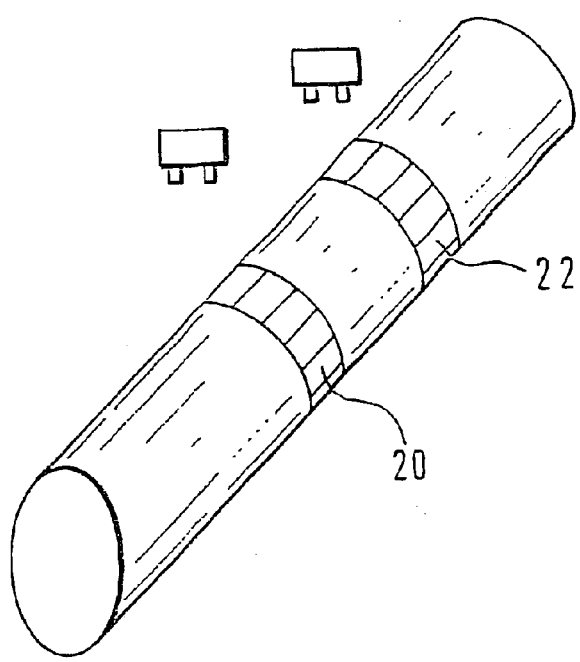
FIG. 3 shows a further steering-wheel angular sensor device as the third preferred exemplary embodiment of the device according to the invention, in which a radial field is used instead of the axial field used in FIGS. 1 and 2.

In the following description, reference is largely made exclusively to magnetic fields and, in the case of the exemplary embodiment shown in FIG. 4, reference is made to an electrical field; one skilled in the art should recognize, however, that random combinations, i.e., any electromagnetic fields, can be used. For example, light diodes could be used as field poles instead of magnets, the emitted field of which can be detected using appropriate opto-electronic sensors.

The exemplary embodiment shown in FIG. 1 includes a disk mounted on the steering axle 10, on which disk code tracks 20, 22 are provided. Each of the code tracks 20, 22 comprises a plurality of alternatingly arranged permanent magnets, as indicated by the arrows pointing in different directions. The two code tracks 20, 22 are distributed differently, whereby it is particularly advantageous for the smallest possible difference to exist, e.g., a difference of only one pole pair. In the exemplary embodiment shown, one of the tracks 20, 22 contains a spacing of n pole pairs, while the other has a spacing of n+1 pole pairs. When the rotatable body 10 rotates—the steering axle in this case—the code tracks 20, 22 are therefore rotated by a corresponding angle in the exemplary embodiment shown. Sensor arrangements 12 and 14 are provided on a fixed part of the device over each of the code tracks 20, 22. Using the sensor arrangement 12, 14, the relative position of the magnetic code track 20 or 22 lying under it can be detected.

The detected sensor elements can be measuring elements that produce conventional sinusoidal/cosinusoidal signals, such as AMR-, GMR-Hall sensors. The evaluation algorithm can be carried out according to the arc tangent method.

In the case of the exemplary embodiment shown, each of the sensor arrangements 12, 14 comprises two sensors 12a, 12b or 14a, 14b. The sensors 12a and 12b or 14a and 14b provided in pairs in each case are advantageously separated by a quarter or eighth period of the periodically changing magnetic field formed by the code tracks 20, 22. Such a separation makes it possible to connect the sensors as half-bridge of a Wheatstone bridge circuit in each case, so that a simple evaluation circuit can be realized, because subtraction is performed on the one hand and, on the other, a nearly linear angle signal that can be evaluated directly is provided when elements are used having substantially linear characteristics.

The angular positions detected therewith can be referenced against each other, so that, when the generally known vernier method or, better, when a modified vernier method, or a combination of the two is used, the real angle of the rotatable body 10 can be determined. The expanded vernier method is described in the publication DE-A-195 06 938, so this procedure need not be described in further detail.

Although the field-producing portions of a respective device move on the exemplary embodiment shown, one skilled in the art will recognize that a corresponding reversal is also feasible, in which the sensor arrangements move with the rotatable body, while the code tracks are provided fixed in position around the rotatable body.

The particularly advantageous distance between two sensors 12a, 12b or 14a, 14b is shown in detail in the tangential sectional view in FIG. 1B.

Finally, one can see, in the sectional views in FIGS. 1C and D, how the respective code tracks are present in different positions with regard for the sensor arrangements at different angles of the rotating body.

In the case of the exemplary embodiment shown in FIG. 2, a field-changing device is used instead of the magnetic tracks, which said field-changing device also defines code tracks 24, 26. The mode of action and the general construction is similar to FIG. 1, so the description will not be repeated here. It is to be mentioned, however, that, in the exemplary embodiment shown, a stationary permanent magnet 28 is positioned underneath the disk, which said disk moves with the rotatable body 10 and contains code tracks 24, 26. In the exemplary embodiment shown, the code tracks are formed by means of simple recesses, but one skilled in the art should recognize that the most diverse possibilities can be used here. It would be feasible, for example, to provide regions having a different magnetic permeability instead of the simple recesses. When fields other than magnetic fields are used, a corresponding design would be feasible with consideration for different dielectric properties, optical properties, or combination dielectric and magnetic permeability properties.

A further exemplary embodiment of the device according to the invention is shown in FIG. 3, in which the code tracks 20, 22 are not arranged on a disk, but rather are integrated directly in the steering axle 10. The code tracks therefore provide a radially periodically changing field that can be detected using appropriately situated sensor arrangements 12, 14. The evaluation is carried out as it is with the preceding exemplary embodiments using the vernier method, so that the existing phase difference between the detection signals can be used to determine the overall rotational angle of the steering axle. Every sensor arrangement 12, 14 also comprises two sensors that are separated by a quarter period λ/4 of the changing field, in order to make a simple evaluation possible.

Figure 4:
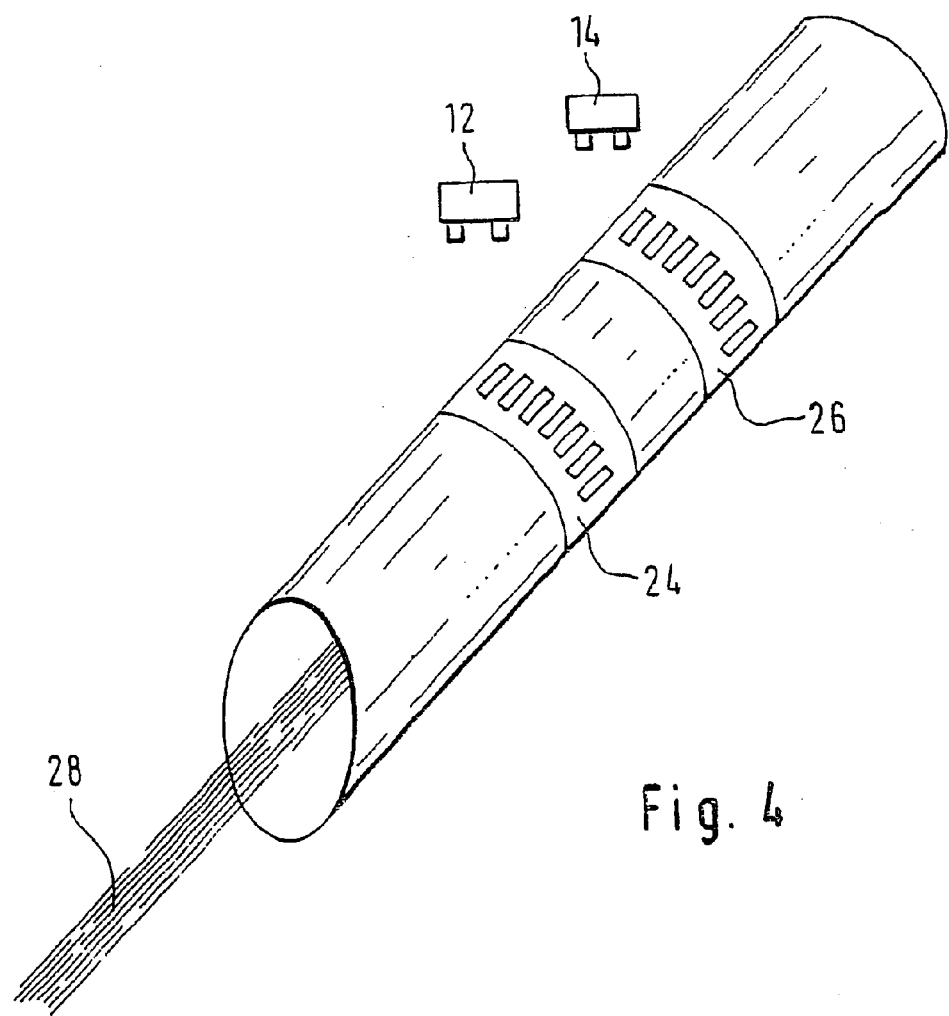
FIG. 4 shows a variant of the embodiment shown in FIG. 3, whereby, as in FIG. 2, field-changing devices are used instead of field-producing devices.

Shown in FIG. 4 is a further preferred exemplary embodiment of the device according to the invention that basically combines the principles of the exemplary embodiments presented in FIGS. 2 and 3. In the case of this exemplary embodiment, the rotating body 10 is designed as a hollow tube, in the middle of which a simple current-carrying wire or an optical waveguide—as the field-producing device—can be arranged. The rotating body 10 contains two rings having recesses that form code tracks 24, 26 as described hereinabove. As is the case with the other exemplary embodiments described previously, each of the code tracks should comprise a different spacing, in particular a spacing that differs by one, i.e., one of the code tracks should comprise a number of "n" openings, while the other should comprise a number of "n+1" openings. The sensors are arranged in accordance with the exemplary embodiment in FIG. 3, in order to detect the changing field in each case above a respective track 24, 26 when the rotating body 10 rotates. The entire rotational angle is determined from the difference—in particular, the phase difference of two signals—in the usual manner by means of an evaluation circuit and the vernier method.

Figure 5A:
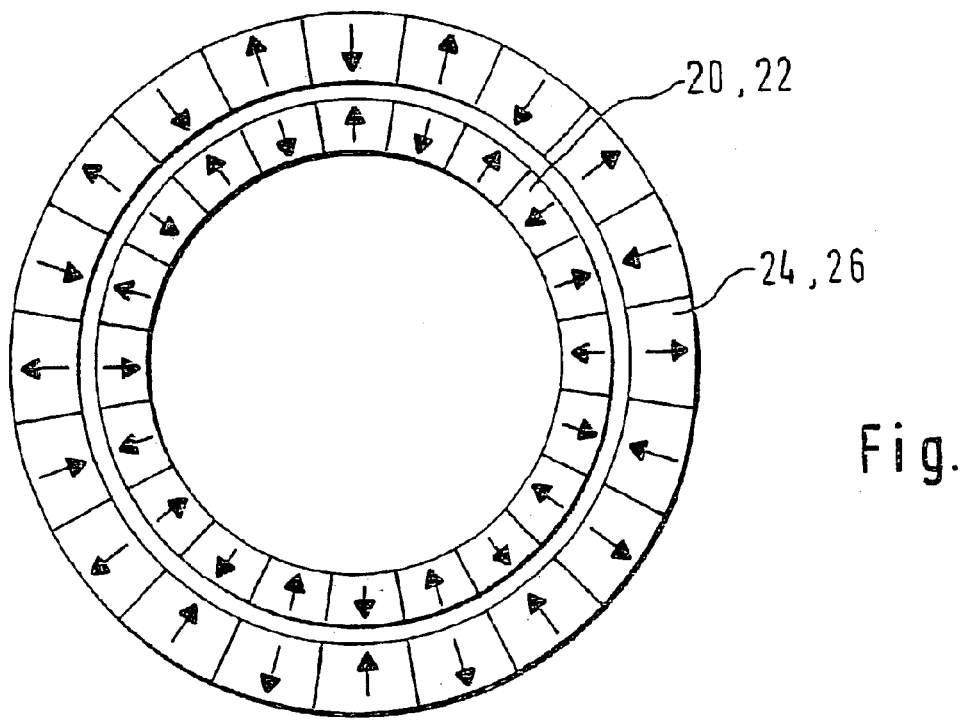
FIG. 5 shows a further variant of the embodiment shown in FIG. 3 in different angular positions (FIG. 5A, FIG. 5B), whereby a field-producing arrangement functions as the field-changing arrangement.
Figure 5B:
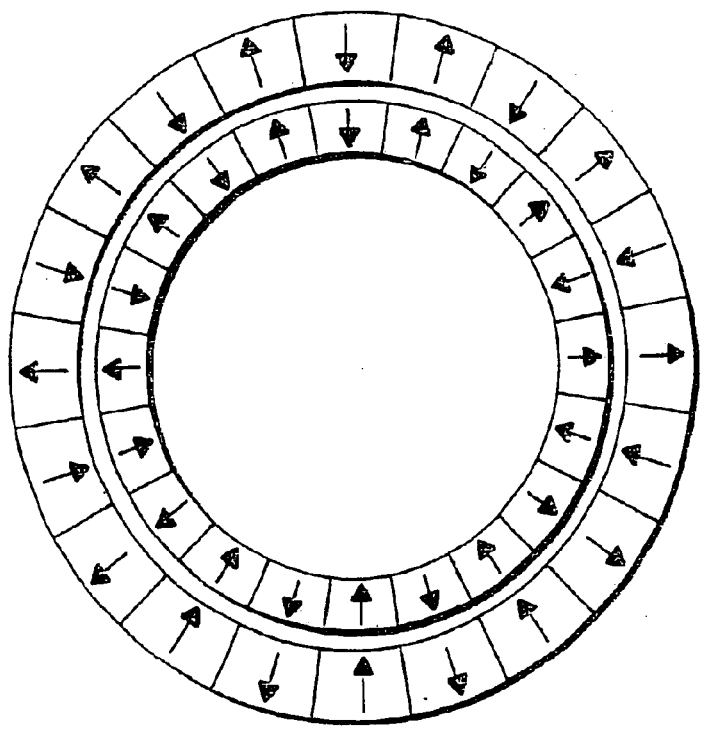

FIGS. 5a and 5b show a schematic view of one of the first and second devices that output different signals to a not shown evaluation circuit in response to the rotation of the body 10. In the case of the exemplary embodiment shown here, annular magnet multi-pole wheels 20, 22 and 24, 26 are used in similar fashion as with the exemplary embodiment shown in FIG. 3, whereby the inner multi-pole ring is interconnected with the rotating body 10, as in the preceding exemplary embodiments. The outer magnet pole ring 24, 26 is designed rotatable in nature in relation to the rotatable body 10 and the inner magnet pole ring 20, 22, so that a periodically changing, reciprocal influence of the respective fields that are formed results. In the case of the position shown in FIG. 5a, respective magnet poles oppose each other in such a fashion that the fields essentially cancel each other out. In the angular position shown in FIG. 5b, the poles are arranged in such a fashion that the respective field strengths add up.

Figure 6A:
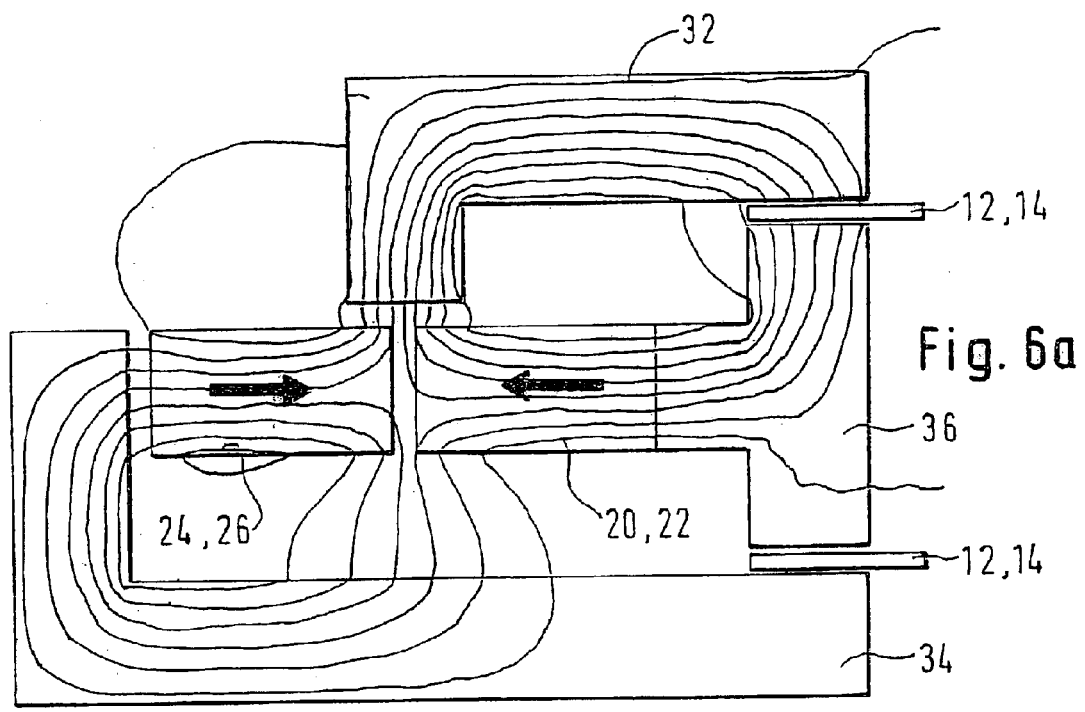
FIGS. 6a and 6b show view of a field evaluation devices as a further component of the arrangement corresponding to the field.
Figure 6B:
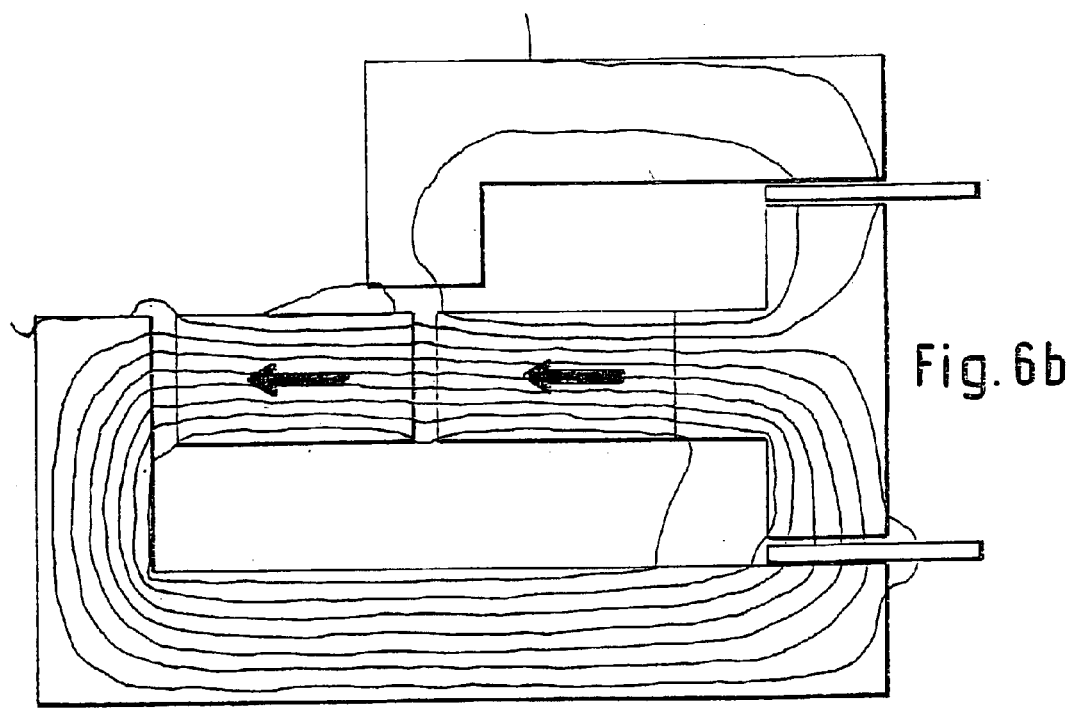

FIGS. 6a and 6b show views of a field evaluation device as a further component of the arrangement responding to the field, which said field evaluation device includes two Hall sensors 12, 14 in front. The fields produced by the multi-pole rings shown in FIG. 5 are directed to the Hall sensors 12, 14 by field conducting elements 32, 34, 36. As one skilled in the art will recognize in the views shown in FIGS. 6a, 6b, an upper flux concentrating piece 32 is provided that guides field lines in the transition area between the two multi-pole rings 20, 22 and 24, 26 toward one of the Hall sensors. As shown in FIG. 5a, closed field lines are therefore formed in the upper portion when the pole positions are anti-parallel, whereby a tee 36 is provided as a further flux concentrating piece behind the upper Hall sensor 12, 14. After the rotatable body is rotated toward a position in which the poles of the multi-pole rings are parallel—as shown in FIG. 5b—the field lines are closed by the lower flux concentrating piece 34 and the tee 36, whereby a further Hall sensor is situated between the tee 36 and the lower flux concentrating piece 34. By providing two Hall sensors in the manner shown, and by using a principle of differences, insensitivity to temperature fluctuations and ageing can be obtained, because the output signal can be standardized against the total flux. One skilled in the art should recognize, however, that this subtraction is purely optional. As is the case with the preceding exemplary embodiments as well, a portal to any fields other than magnetic fields can be provided.

In summary, it can be stated that the device according to the invention makes it possible to determine the angle of the rotatable body exactly and simply, and no contact, e.g., by toothed wheels or the like, is necessary. In other words, a simple and exact angle measurement or angular velocity measurement takes place in a contactless manner using simple, known components which—as mentioned hereinabove—should advantageously contain elements having a linear characteristic. The different adaptations to different field-producing and/or field-influencing devices should be common knowledge to one skilled in the art and therefore need not be described here in any greater detail. Once moveable parts can be eliminated entirely, the device according to the invention is particularly suited for use as a steering-wheel angular sensor, in particular since a high degree of measuring accuracy is given while requiring only minimal installation space.

Although the present invention was described hereinabove completely and in detail with reference to purely illustrative exemplary embodiments preferred at this time, one skilled in the art should recognize that the most diverse modifications are possible within the scope of protection defined by the claims. In particular, one skilled in the art should recognize that individual features of an exemplary embodiment can be combined in any fashion with other features of other exemplary embodiments. In this context it would also be feasible, for example, to provide one of the code tracks according to an arrangement of FIG. 4 or 5, while the other code track is provided in accordance with a design according to FIG. 1 or 2.

Various exemplary embodiments of combination steering-angle/steering-torque sensors, including the associated evaluation procedure, are shown in FIGS. 7 through 11. The multi-pole wheels are read in each case by sensor elements that deliver sinusoidal/cosinusoidal signals. The evaluation of the output signals from the sensor elements takes place according to the modified vernier method, about which the following is to be noted:

Transfer of the modified vernier principle to the circumstances described (FIG. 1e):

Determination of $\phi$:

$$\varphi = \alpha + i\frac{360°}{n+1}$$

$n$: number of pole pairs $\alpha, \beta$: measured values of sensors $i, j$: unknown $$\varphi = \beta + j\frac{360°}{n}$$

Equate and transform:

$$\frac{\alpha + \beta}{360°} * n * (n+1) = j*(n+1) - i*n = \text{whole number, with } i = j = k$$

Therefore:

$$\frac{\alpha + \beta}{360°} n(n+1) = k, \text{ with } k \text{ being a whole number,}$$

$$\varphi = \frac{(\alpha + \beta)}{2} + k * 180° * (1/(n+1) + 1/n)$$

Errors that make their way into the evaluation can be reduced using special correction procedures in which principles of the classical and/or the modified vernier principle are taken into account.

Figure 8:
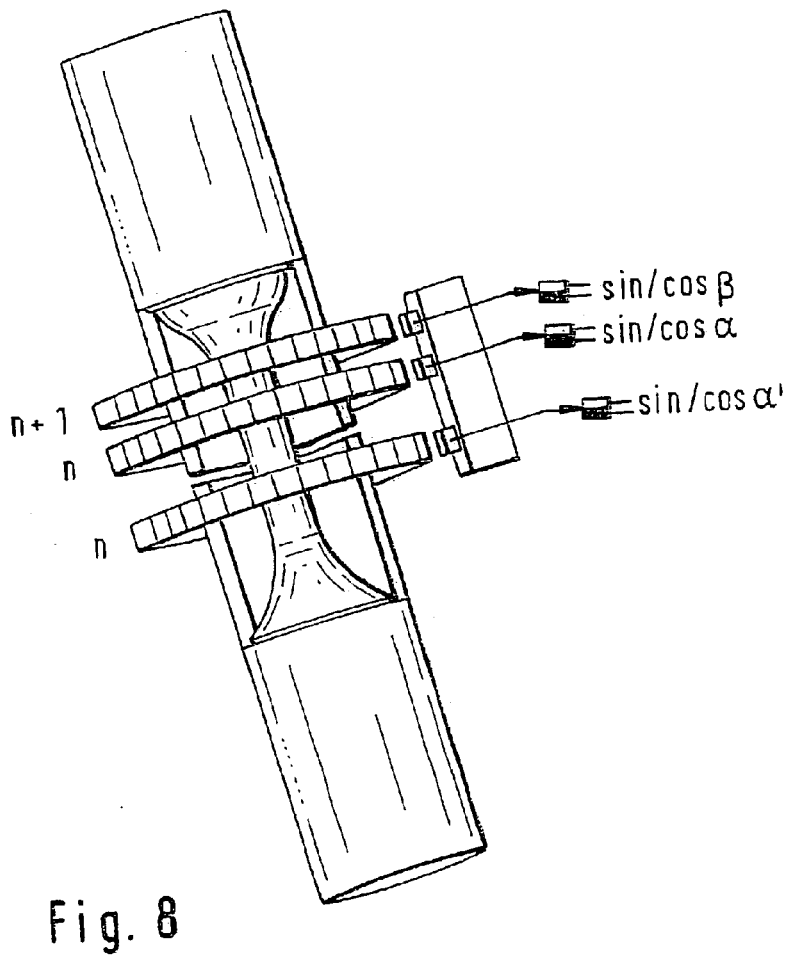
FIG. 8 shows a further exemplary embodiment of a combination steering-angle/steering-torque sensor (schematically).
Figure 10:
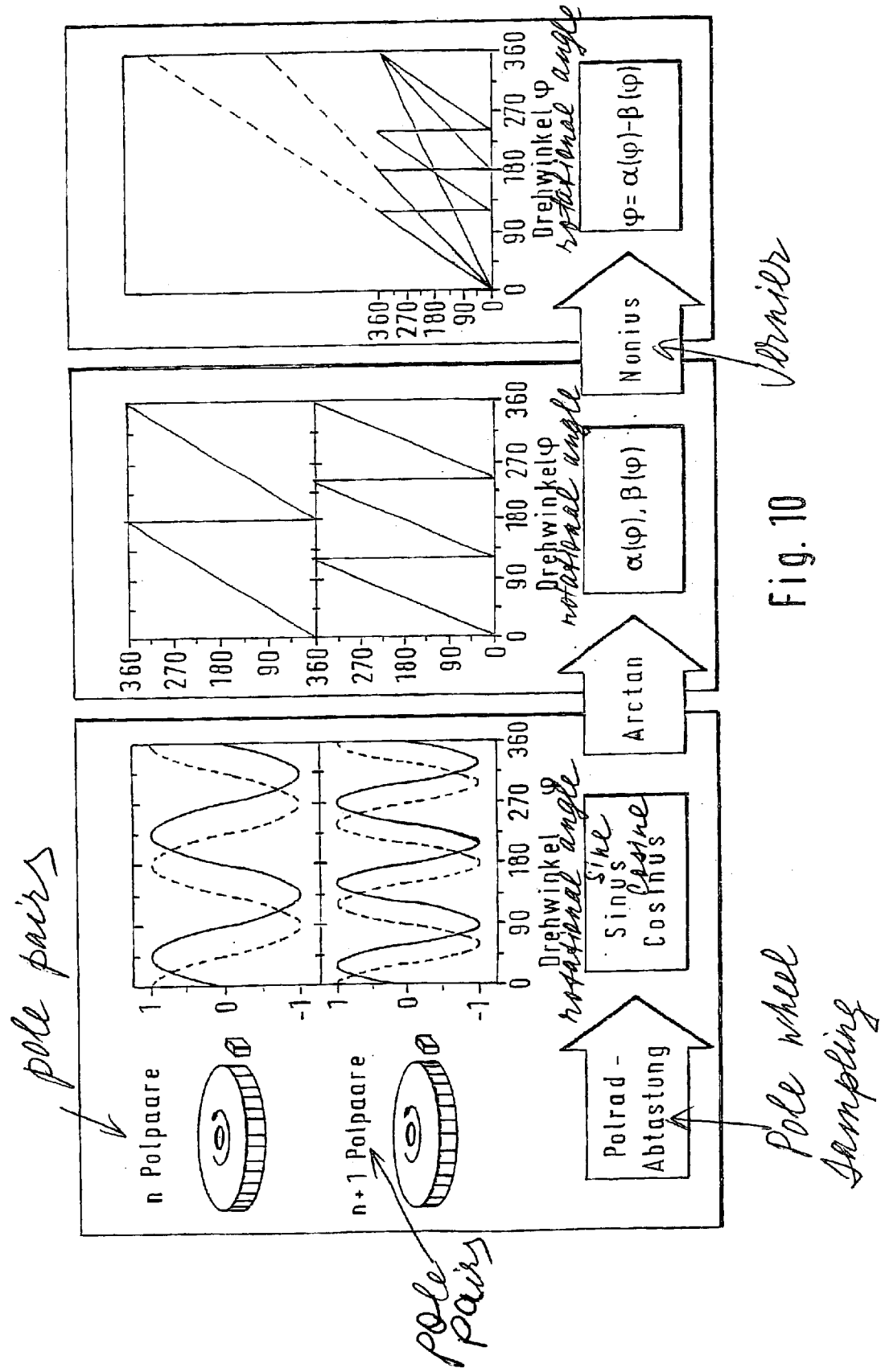
FIG. 10 shows the evaluation of the signals from a combination steering-angle/steering-torque sensor.
Figure 11:
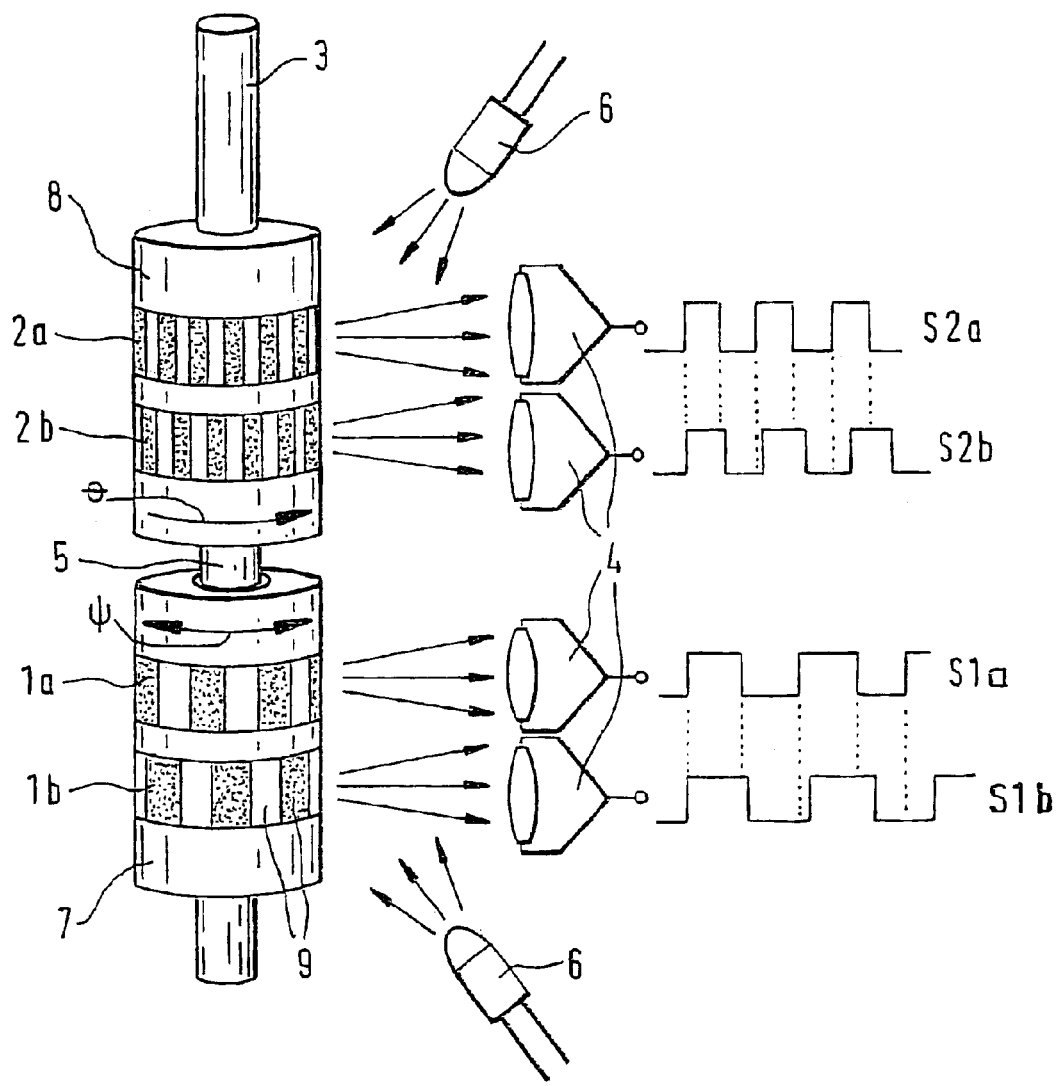
FIG. 11 shows an optical device having two stacked optical devices, each of which has two code tracks and four sensors.

In addition to the angle, the acting torque, e.g., the steering torque, can also be determined using the sensors according to FIGS. 7 and 8.

The acting torque during the steering procedure causes the torsion bar integrated in the steering column to twist. The upper end rotates in relation to the lower end by a maximum of +/−5°, for example. In order to measure the torque, this relative rotational angle—the "torsional angle"—must be measured. There are two ways to do this: the absolute steering angle of the upper and lower ends of the torsion bar are each determined using the method described under point 1). The difference between the two angles equals the torsional angle. Or, it can be measured directly via the relative displacement of two identically-coded pole wheels, one of which is situated at the top of the torsion bar, and the other of which is situated at the bottom of the torsion bar. A minimum of three pole wheels are needed for this. These possible methods are presented in summary form in FIG. 9.

Various Exemplary Embodiments

Pole wheel combinations: Each pole wheel can thereby be regarded as a magnetic code track as well.

Steering angle determination using
- two pole wheels, the pole pair number of which is relatively prime, e.g., with n and n+1 pole pairs; they can also be situated as two code tracks on one pole wheel;
- three pole wheels with n−1, n and n+1 pole pairs. This combination increases the accuracy, while simultaneously creating redundancy. It is expandable to include more pole wheels with corresponding pole pair numbers;
- Addition of a "three-poled" pole wheel for differentiation of area when sensor elements are used that have ranges of unambiguousness of less than 360°;
- Expand the measuring range by a pole wheel number>2.

Determine the steering torque
- by calculating the absolute difference
- by measuring the relative angle of identically-coded pole wheels For the exemplary embodiment shown in FIG. 8, a detailed description will now be provided as to how the absolute angle and the torque can be measured simultaneously using the same measuring principle and a minimal number of sensors and assemblies. The two variables are determined in contactless fashion, and self-diagnosis is possible. Access by different systems, such as via a CAN bus (Controller Area Network) is possible.

The proposal is based, for example, on the simultaneous measurement of the steering angle and the steering torque. A magnetic measuring method is presented as the measuring principle. The proposal is not limited to this magnetic method, however. Any principle—optical, eddy current, inductive, . . . —that is based on analog sinusoidal-cosinusoidal signals can be used.

As illustrated in FIG. 7, a torsion bar is built into the steering system in order to measure the rotational angle and torque. Two multi-pole rings with M and M+X magnetic poles are situated on the one end of the torsion bar. A third multi-pole ring having N magnetic poles is situated at the other end. A sensor (AMR, Hall, GMR, magnetoresistor) is located over each ring. Each sensor delivers a sinusoidal signal and a cosinusoidal signal that is a function of the mechanical angle.

Measuring the Steering Angle

The multi-pole rings and sensors located on one end are used to measure the steering angle. If X=2, the absolute angle can be determined using the modified vernier method. This method is to be used here, and the absolute angle is calculated with the signals S1 (U sin(1), U cos(1)), and S2 (U sin(2), U cos(2)).

Measuring the Torque

The torque is measured via the angular difference. The torque is proportional to the angular difference in the elastic measuring range of the torsion element. The angular difference is determined via the two signals S1 (U sin(1), U cos(1)) and S3 (U sin(3), U cos(3)) at the torsion ends.

The sensor delivers two signals:

$U \sin(1) = A1 * \sin(w1) + O \sin(1)$ $U \cos(1) = A1 * \cos(w1) + O \cos(1)$

Sensor 3 also delivers two signals:

$U \sin(3) = A3 * \sin(w3) + O \sin(3)$ $U \cos(3) = A3 * \cos(w3) + O \cos(3)$

Whereby U represents the electrical signals at the respective mechanical angle w. A represents amplitudes, and O represents the offset values of the sensors. By means of the mechanical rotation, the amplitudes and offsets of the four signals can be determined from maxima and minima. An alternative method for offset determination and offset compensation was demonstrated in DE-P 199 28482. The corrected signals U# are purged of offset.

$$U\#\sin(1) = U\sin(1) - O\sin(1) = A1 * \sin(w1)$$

$$U\#\cos(1) = U\cos(1) - O\cos(1) = A1 * \cos(w1)$$

$$U\#\sin(3) = U\sin(3) - O\sin(3) = A3 * \sin(w3)$$

$$U\#\cos(3) = U\cos(3) - O\cos(3) = A3 * \cos(w3)$$

The angular difference w1−w3 is the result that is sought. Using analog electronic operations (multiplication, subtraction, comparation), or by processing at the digital level, the difference can be determined as follows:

$$U\#\sin(1) * U\#\cos(3) - U\#\cos(1) * U\#\sin(3) =$$
$$A1 * \sin(w1) * A3 * \cos(w3) - A1 * \cos(w1) * A3 * \sin(w3) =$$
$$A1 * A3 * \sin(w1 - w3)$$

The following applies for small angles: sin(w1−w3)=w1−w3
with 0.1% relative error in the angular interval (−4.4° to +4.4°) in degrees or (−0.077 to −0.077) in rad.
The angular difference, therefore, is:

$w1-w3 = (U\#\sin(1)*U\#\cos(3) - U\#\cos(1)*U\#\sin(3))/(A1*A3)$

This evaluation method is very sensitive to the smallest angular differences. Using the procedure described above, the torque can be determined directly from the angular difference. Another starting point would be to adjust the difference to zero using a closed loop. The controlled variable would be equal to the angular difference.

Remarks:
1) Another combination of signals is possible as well; they should also lead to a sine of the angular difference.
2) The angular difference could also be obtained by means of the difference between two absolute angle sensors. This would require 4 sensors and 4 multi-pole rings, and the method would place requirements on the absolute angular measurements that are too high. In this case, the difference of two large angle values is obtained.

Self-Diagnosis

Absolute angle: For the absolute angle, the known method of the modified vernier principle is used. Tracking the whole-number k (allowed/not allowed) jumps makes it possible to detect errors and implement a line-of-retreat strategy.

Torque: If the angular difference exceeds the maximum permissible range, e.g., +/−4°, an error message is output. If overload occurs, for example, the system stops intervening.

The new difference to be calculated (U# cos(1)*U# cos(3)+U# sin(1)* U# sin(3))/(A1*A3) must not deviate from 1 by more than 0.5% (cos^2 (4°)=0.995.

Another alternative would be to check the expression (U# sin(3)*U#sin(3)+U# cos(3)*U# cos(3))/(A3*A3)* for a deviation from 1 of 0.5%. At the same time, the whole number k must not perform any unpermitted jumps.

The device in particular for contactless and optical measurement of an angle and/or torque according to FIG. 12 will be described in greater detail hereinbelow. As illustrated in FIG. 12, the two devices 7 and 8 are situated on one rotatable body 3. The rotatable body 3 is preferrably designed as a steering axle in a motor vehicle and comprises a torsion element 5 with which the torque acting on the steering axle 3 can be measured. The two devices 7, 8 are situated on both ends of the torsion element 5, so that, when the torque acts on the torsion element 5, a different rotational angle than the angular difference Θ−Ψ can be measured.

The two devices 7, 8 each comprise two code tracks 1a, 1b or 2a, 2b. The code tracks are designed equal in nature with regard for the width of their adjacent fields, but they have a different number of markings 9 around their circumference. For example, the code track 1a has 45 markings 9, the code track 1b has 50 markings 9, code track 2a has 44 markings 9, and code track 2b has 48 markings 9 distributed around their circumferences. In an alternative exemplary embodiment of the invention, it is provided to provide a multiple of these markings 9 around the circumference. Two adjacent markings or fields 9 in each case differ in terms of their light intensity, color and/or size. They are preferably designed as light-dark fields, so that sharp and high-contrast light-dark transitions result. To increase the contrast, light fixtures 6 are provided that are associated with the devices 7, 8 in such a fashion that they shed the light reflected by the markings 9 into associated sensors 4. As further illustrated in FIG. 12, a sensor 4 is assigned to each code track 1a, 1b, 2a, 2b, which said sensor essentially receives only the light reflected from the associated code track. The sensor 4 converts the light signal received into uniform electrical signals, which can be picked off as a digital signal S1a, S1b, S2a and S2b at the output of the sensors 4, and are directed to a not shown evaluation circuit.

An aspect that is considered essential to the invention is the fact that the markings 9 of the code tracks 1a, 1b or 2a, 2b are designed uniform in nature. In each case, both code tracks 1a, 1b or 2a, 2b of the devices 7 or 8 are coordinated with each other exactly and comprise a relative phase offset. This phase offset is also reflected in the electrical signal S1a, S1b, S2a, S2b, as illustrated in FIG. 12 using the dashed lines. The offset, therefore, becomes increasingly greater from one pulse to the next pulse as the rotational angle increases, so that this difference is evaluated using a standard or, in particular, the known, modified vernier method, which was also made known in DE 195 06 938 A1.

It should be noted that the smallest unit of a marking 9 is determined in particular by means of the light-dark transition. The greater the contrast of these transitions, the lower the sensitivity to disturbance, and the likelihood that measuring errors will occur. To lower the susceptibility to interference, an enclosing metal-cladding 10 is preferably provided, which encloses the rotatable body 3 with the greatest sealing effect possible.

As described previously, 44 to 50 markings 9 were selected for each of the four code tracks 1a, 1b, 2a and 2b in order to obtain a high level of measuring accuracy and angle resolution for the rotational angle using the modified vernier method, if possible. When the markings 9 are selected in this manner, the measured values from the tracks 1a, 1b repeat five times per circumference and, in the case of the tracks 2a, 2b, they repeat four times per circumference. If these measured values undergo the modified vernier method anew, a measured value results that is unambiguous around the entire circumference (2 π). A high resolution for the angle is therefore obtained, which results from the high dividend. At the same time, a range of unambiguousness of one full rotation is obtained. The modified vernier method makes it possible for an angular difference to be present between the first code tracks 1a, 1b and the second code tracks 2a, 2b without diminishing the accuracy. This angular difference can also result from the rotation of the torsion bar 5, for example. If the angular difference Θ−Ψ is measured in accordance with the two devices 7, 8, then the torque transferred by the steering axle 3 can be determined in addition to the torque when the torsional stiffness of the torsion element 5 is known.

In an alternative embodiment of the invention, one or more further optical code tracks of a third device are feasible, of the type described hereinabove in conjunction with the magnetic devices.

What is claimed is:

1. A steering-wheel angular sensor for measuring an angle of a rotatable body, the device comprising at least first and second devices operative for outputting different signals to an evaluation circuit in response to a rotation of the rotatable body, each of said devices including two optically readable code tracks and one optical sensor assigned to each of said code tracks, said sensor being formed to detect only signals from an assigned one of said code tracks and sending information as electrical signals to the evaluation circuit, each of said code tracks having numerous optically detectable markings, provided so that a number of said markings on one side of said code tracks is equal to n, and a number of said markings on the other of said code tracks equals n+b 1,so that the angle is measurable by a modified vernier method in accordance with the formula:

$$\varphi = \frac{(\alpha + \beta)}{2} + k * 180° * (1/n + 1) + 1/n),$$

wherein α and β are measured values of the sensor,
n is a number of pole pairs, and
k is a whole number.

2. The steering-wheel angular sensor as defined in claim 1, wherein said markings comprise fields that differ by at least one parameter selected from the group consisting of light intensity, color, and size.

3. The steering-wheel angular sensor as defined in claim 2, wherein said markings have light-dark fields that alternate with light-dark transitions.

4. The steering-wheel angular sensor as defined in claim 1; and further comprising a light source which illuminate said markings.

5. The steering-wheel angular sensor as defined in claim 1, wherein at least one said devises has two said code tracks with markings have a same design.

6. The steering-wheel angular sensor as defined in claim 1, wherein said markings are designed so that the modified vernier method is useable anew on results of measurements of said code tracks.

7. The steering-wheel angular sensor as defined in claim 1, wherein the device further measures a torque of the rotating body, said device further comprising a torsion element having a known torsional stiffness, wherein said torsion element is switchable between said two devices.

8. The steering-wheel angular sensor as defined in claim 7, wherein said two devices are formed so that the torque is measurable based on an offset angle between said two devices.

9. The steering-wheel angular sensor as defined in claim 1; and further comprising at least one further code tract.

10. The steering-wheel angular sensor as defined in claim 1; and further comprising an enclosing metal cladding formed so as to protect said devices extensively against contamination.

11. The steering-wheel angular sensor as defined in claim 1; and further comprising means for arranging the device relative to a steering axle of a motor vehicle so as to measure said parameter of the steering axle as the rotatable body.

* * * * *